May 7, 1963 W. H. ARMACOST 3,088,443
CYCLONE TYPE FURNACE AND METHOD OF OPERATION
Filed March 24, 1958 2 Sheets-Sheet 2
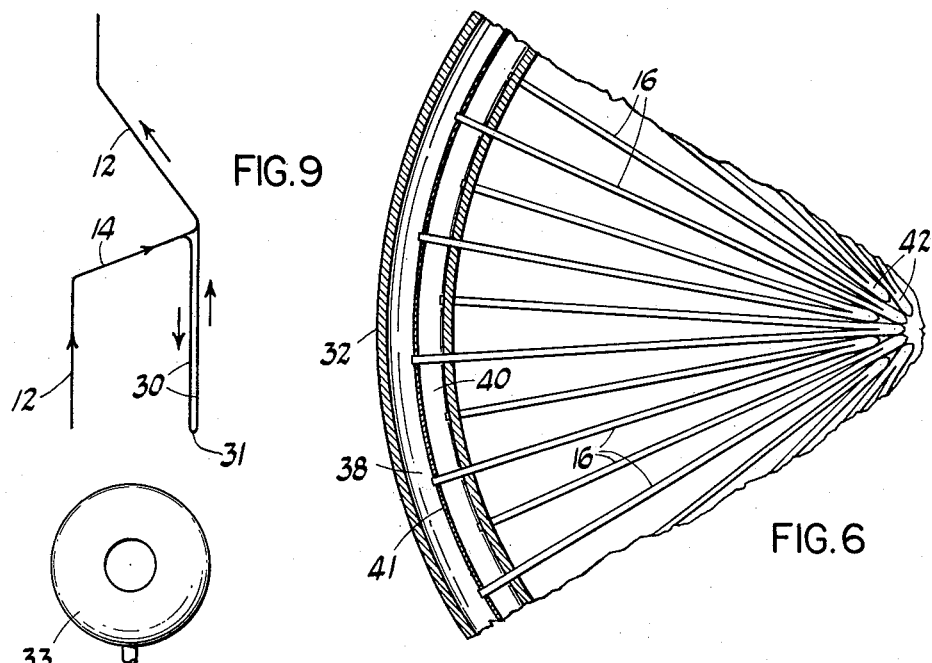
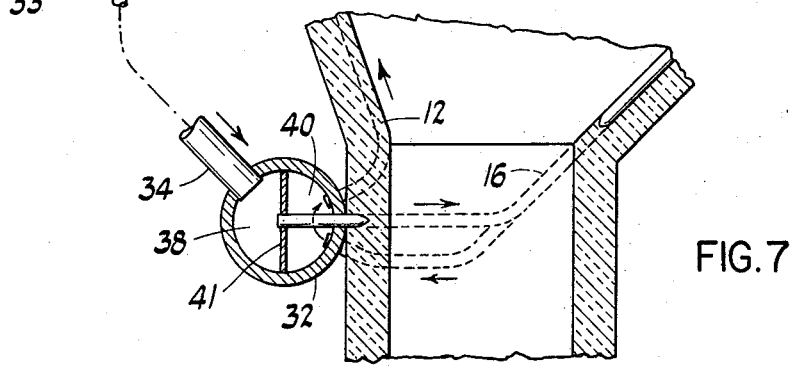
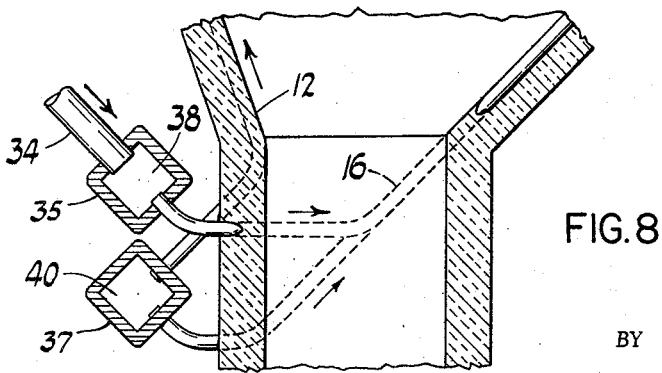
INVENTOR.
WILBUR H. ARMACOST
BY
AGENT

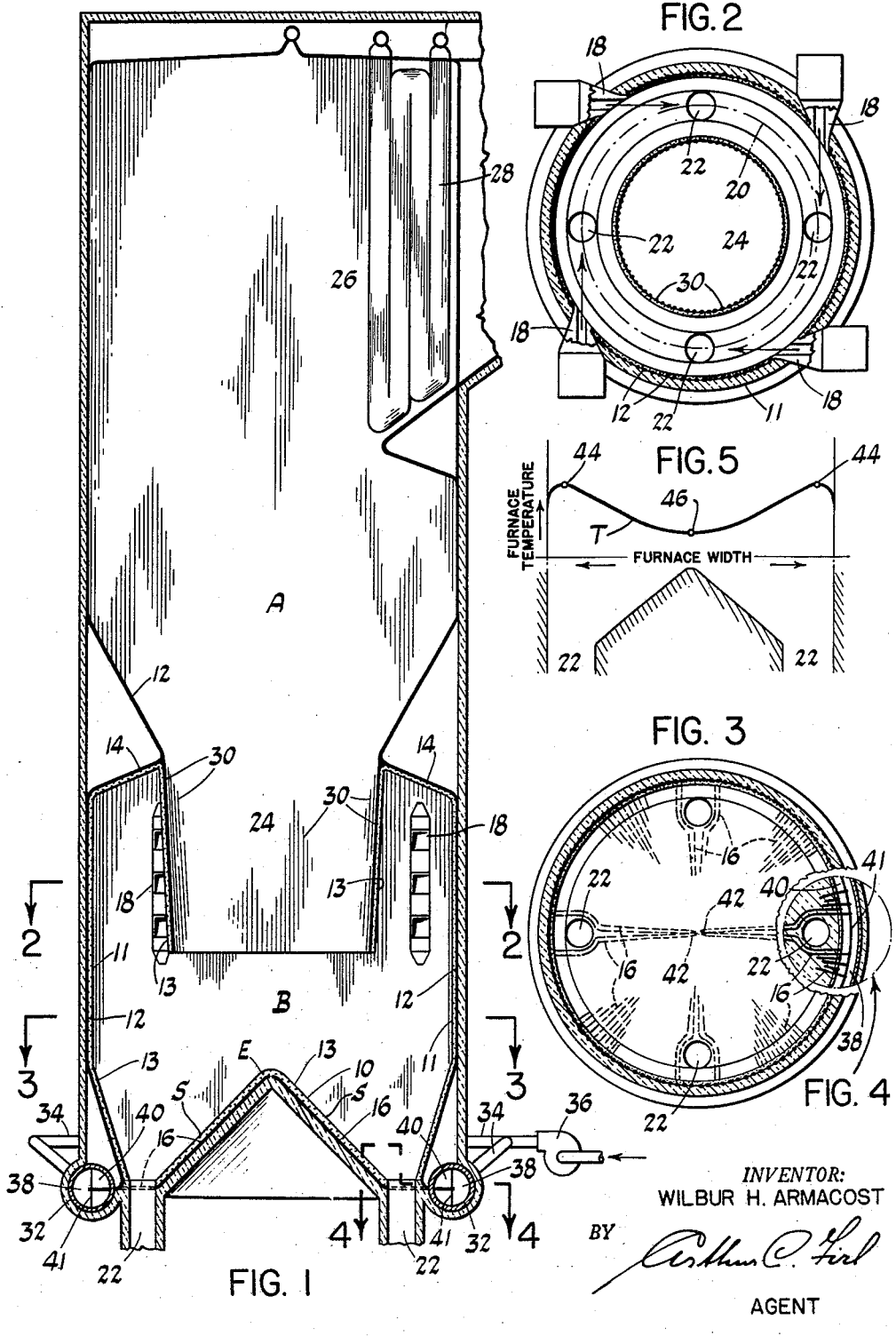

United States Patent Office 3,088,443
Patented May 7, 1963

3,088,443
CYCLONE TYPE FURNACE AND METHOD
OF OPERATION
Wilbur H. Armacost, Scarsdale, N.Y., assignor to Combustion Engineering, Inc., New York, N.Y., a corporation of Delaware
Filed Mar. 24, 1958, Ser. No. 723,579
3 Claims. (Cl. 122—235)

The invention relates to cyclone type slagging furnaces used in connection with steam generators and is particularly concerned with improvements in the bottom construction of such furnaces and in the method of operating same.

In a cyclone type steam generator burning an ash forming fuel and in which the ash is removed in liquid form, great difficulties are often experienced when operating at low loads in maintaining the ash in a molten condition and in dealing with accumulated viscous or solidified ash quantities.

As is known, in wet bottom or slagging installations of steam generators a liquefaction of the ashes introduced with the fuel can only be accomplished at loads or firing rates above a predetermined value depending on the particular fuel employed and the construction and design of the furnace. At loads below this value the ash residue or slag is deposited in a viscous, pasty and semifluid condition or in powdery form. The pasty slag causes great difficulties in the operation of the wet bottom furnace because it leads to a clogging of the slag discharge opening. While the slag when in liquid form flows downwardly on the walls of the wet bottom furnace to the bottom of same and from there through the slag discharge opening into the water bath of the slag removal apparatus, the pasty slag "slides" on the cooled furnace bottom towards the discharge opening and, as it cannot flow off due to its increased viscosity, it chokes off the discharge opening. The ash residue of pasty or powdery form produced during the subsequent low load operation of the furnace therefore accumulates on the bottom of the furnace. Depending on the duration of the low load operation a more or less thick layer of slag is thereby formed.

When changing from low load operation to higher loads, these slag or ash deposits slowly begin to melt from the top downwards under the influence of the rising temperature in the furnace without however being able to flow off as the slag discharge opening is still obstructed. Only when the slag plug in the discharge opening is also melted down can the slag run off, and within a short period of time the mass of slag which had accumulated in the bottom is released and flows off in a gush. This sudden excessively large slag quantity imposes an inordinately heavy demand on the capacity of the slag removal installation and it therefore becomes necessary to design the latter for accommodating a considerably larger slag capacity than would be required for handling the average slag quantity. Still greater difficulties are experienced in providing the large amount of water necessary for the cooling and granulation of the slag, as about 1½ gallons of water per pound of slag are required for cooling. This therefore makes it necessary to design the cooling water pumps and the water supply and discharge piping for dimensions greatly in excess of normal requirements, with the result that the slag removal installation and the cooling water pumps operate at low efficiency under normal operation.

In order to eliminate or reduce these difficulties it had been suggested to subdivide the wet bottom furnace into several slagging chambers for improving the low load operation of the furnace installation. This however, would greatly increase construction costs, and the subdivision of the slagging chamber furthermore would involve other problems, especially in regard to water circulation.

According to my invention the above difficulties are alleviated by constructing the furnace bottom so as to place the slag outlet opening in the region of highest furnace temperature.

It is accordingly a primary object of the invention substantially to extend the trouble fee low load operating range of a cyclone type steam generating furnace by improving the construction and shape of the furnace bottom in conformity with prevailing furnace temperatures.

Another object of the invention is to greatly retard the freezing and accumulation of the ash in the bottom of the furnace at low loads, and the resulting overtaxing of the ash removing equipment when the unit is subsequently operated at higher load.

Other and further objects of the invention will become apparent to those skilled in the art as the description proceeds.

With the aforementioned objects in view, the invention comprises an arrangement, construction and combination of the elements of the inventive organization and method in such a manner as to attain the results desired as hereinafter more particularly set forth in the following detailed description of an illustrative embodiment, said embodiment being shown by the accompanying drawing wherein:

FIG. 1 is a sectional side elevation of a cyclone type steam generator with the lower portion of the furnace embodying my invention;

FIG. 2 is a horizontal section through the cyclone chamber when taken on line 2—2 of FIG. 1;

FIG. 3 is a horizontal section through the cyclone slagging chamber when taken on line 3—3 of FIG. 1;

FIG. 4 is a partial section through the lower portion of the cyclone chamber when taken on line 4—4 of FIG. 1;

FIG. 5 is a graphical illustration of variations in furnace temperature across the furnace width, as related to my inventive improvement.

FIG. 6 is an enlarged partial plan view of the raised furnace bottom showing how the hairpin shaped tubes are radially disposed and connected to the inlet and outlet circular header;

FIG. 7 is an enlarged vertical cross-section through the lower left hand peripheral portion of the furnace bottom and furnace side wall as diagrammatically shown in FIG. 1;

FIG. 8 is a cross section similar to FIG. 7, however employing individual inlet and outlet headers;

FIG. 9 is a diagrammatic illustration of the left side furnace wall of FIG. 1, indicating the direction of flow of the cooling medium through the wall tubes 12 and 30.

In FIG. 1 of the drawing, there is illustrated a steam generating furnace of the cyclone type comprising an upper radiant chamber A and a lower combustion chamber B, the bottom 10 of the latter being constructed in accordance with my invention. The combustion or slagging chamber B is bounded by side walls 11 lined with cooling steam generating tubes 12, a roof 14 and the floor or bottom 10 also being lined with water carrying tubes 16. In the preferred embodiment shown the combustion chamber B is generally of circular cross section as illustrated in FIGS. 3 and 2. However, my invention could equally well be applied to furnaces having an elliptical, rectangular or other polygonal shape. Fuel, such as pulverized coal or other comminuted ash bearing fuel, together with air for combustion, is discharged into the combustion chamber by way of burners 18, four of which are shown in FIG. 2 spacedly arranged around the circumference of chamber B. The fuel and air streams issuing from burners 18 are directed tangentially toward an imaginary firing circle 20 causing the combustion gases to rotate at a relatively high velocity. The heat absorbing surfaces within slagging chamber B such as tubes 12 and 16, are so proportioned that the temperature of the gases is held above the fusion point of the ash within the desired operating range to maintain this ash in a fluid state. During operation the liquid ash droplets carried in the combustion gases are thrown against the side walls of the combustion chamber and the surfaces of the floor and flow downwardly toward and out of one or several slag outlets 22. The slag thereupon drops into a pool of water from which the granulated ashes are removed by an ash handling device not shown.

The rotating combustion gases rise upwardly and are drawn out of an axially located gas outlet duct 24, and enter radiant chamber A lined with steam generating tubes, from whence the gases pass through furnace offtake 26 giving off heat to heating surfaces such as superheater 28 and other conventional heat absorbing surfaces not shown.

Gas outlet duct 24 is lined with heat absorbing tubes 30. The heating surfaces of tubes 12, 16 and 30 lining the interior surfaces of slagging chamber B preferably are extended by welding studs to the tubes in a well known manner. These studded tubes are generally covered with a protective layer of chrome-ore or other refractory 13. The lower ends of tubes 12 and 16 are connected to a circular header 32 which in the embodiment illustrated in FIG. 1, receives water in any conventional manner such as by way of pipes 34 and pumping means 36 from a source not shown. Other means may be employed to feed water to header 32, such as by gravity from a steam and water drum 33, see FIG. 7. In the preferred embodiment illustratively shown in FIGS. 1 and 7, the interior of header 32 is longitudinally subdivided into spaces 38 and 40 by means of a division plate 41. Or two separate headers 35 and 37 may be used as shown in FIG. 8. Tubes 16 lining the bottom of chamber B may take the forms of loops having a return bend 42 located near the center of bottom 10. One end of tube 16 terminates in header space 38 and the other end in header space 40. The lower ends of tubes 12 lining the side wall 11 likewise terminate in space 40. In operation, the feed water flows through pipe 34 into space 38, thence through tubes 16 which cool floor 10 and back into header space 40, thence through tubes 12 which cool the side wall of the chamber. Tubes 12 continue upwardly to form and cool roof 14 and to partially line radiant chamber A. Each tube of a limited number of tubes 12 is connected to a tube 30 lining the axial gas duct 24. Tubes 30 may form loops 31 similar to those formed by floor tubes 16, the outlet end of the former continuing upwardly to join the earlier mentioned tubes 12 in lining the walls of radiant chamber A.

In accordance with my invention the floor 10 of combustion chamber B has an elevated central portion E and is connected with the peripheral wall of the chamber by an outwardly and downwardly sloping surface S.

In the preferred embodiment of FIGS. 1, 2, 3 and 4, surface S is of conical shape. The invention however also contemplates a bottom surface having the shape, for example, of a pyramid with 3, 4 or more sides. Furthermore my invention also incorporates a sloping bottom generally as shown in FIG. 1, but having an irregular surface such as a surface interrupted by valleys, grooves or trenches leading to the slag discharge openings.

In slagging chambers of earlier known designs the slag outlet opening is located in the center of a hopper forming the furnace bottom, thus being bounded by the upwardly sloping hopper sides that join the side walls of the chamber. The slag deposited on the walls of the chamber flows down the walls and the sloping sides toward the central slag outlet opening.

It was found in the operation of cyclone type furnaces, that the temperatures of the combustion gases generally assume the form of curve T (FIG. 5) when plotted against the furnace width. Thus it will be seen that the highest temperature 44 of the gases occurs in a zone adjacent the periphery of the cyclone chamber and that the lowest temperature 46 occurs in a zone just below the axial gas outlet duct. Since when operating at low loads, the temperature of the gases is considerably reduced, but should not fall below the fusion temperature of the ash in order to maintain the ash in a fluid state, it is important that the slag outlet should be located in or directly below the highest temperature zone.

In a cyclonic slagging chamber of prior art design having a vertically extending axial gas outlet and a centrally located slag outlet in a furnace zone where the temperature is relatively low, the fluid ash leaving said outlet will be cooled below the ash fusion point at a relatively high reduced load.

On the other hand a cyclone furnace designed in accordance with my invention and equipped with a bottom of conical or similar shape with the apex of the cone pointing toward the gas outlet duct and having one or more slag outlets arranged in a trough or depression near the peripheral wall of the chamber, can be operated at much lower loads than a conventional cyclone furnace having a centrally located slag outlet. Because the slag outlet is located in the highest temperature zone, my inventive improvement, as herein disclosed, retards cooling and solidification of the ash at the slag outlet at lower loads. My invention also limits or prevents undue accumulation of a viscous or dry mass of ash due to blocking of the slag outlet, which ash after being melted could all at once be released into the ash handling apparatus upon resumption of higher load operation. Accordingly in a cyclone furnace equipped with my furnace bottom it will not be required to install oversized ash and cooling water handling equipment in order to meet the sudden overload occurring at the end of an extended period of low load operation, as would be the case in a cyclone furnace not equipped with my improved bottom construction.

While I have illustrated and described several preferred embodiments of my invention, it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

I claim:

1. In a water cooled upright cyclone type slagging furnace chamber having a roof, a centrally located axial gas outlet duct suspended from said roof, a bottom comprising a peripheral zone and a central zone, and a substantially upright peripheral side wall adjoining said peripheral zone, burners in said side wall for producing a rotating mass of burning gases within said chamber, said gases having a rising temperature characteristic with the temperature rising from the central zone of said chamber to the peripheral zone thereof, a centrally raised portion included in said central zone bottom, said portion having a downwardly sloping side to meet said side wall adjacent the periphery of said chamber, a slag outlet in said peripheral bottom zone adjacent said upright side wall, and means for passing cooling water first through said centrally raised portion in flow paths directed radially from said periphery to said portion and back to said periphery and thence through said side wall and said roof.

2. An organization as defined in claim 1 having a plurality of burners spacedly disposed in said side walls in peripheral direction, and a plurality of slag outlet openings formed in said bottom adjacent said side walls and in alternate relation with respect to said burners.

3. In a water cooled upright cyclone type slagging furnace chamber having a roof, a centrally located axial gas outlet duct suspended from said roof, a bottom and a substantially upright peripheral side wall, burners in said side wall for producing a rotating mass of burning gases within said chamber, said gases having a rising temperature characteristic with the temperature rising from the central zone of said chamber to the peripheral zone thereof; a centrally raised portion included in said bottom, said portion having a downwardly sloping side to meet said side wall adjacent the periphery of said chamber; a slag outlet in said bottom adjacent said upright side wall; a peripherally disposed conduit having means for receiving a supply of circulating water for cooling said bottom, side wall and roof of said furnace chamber; radially disposed tubes of hairpin shape and conforming to the contour of said bottom, with the return ends of said tubes spacedly arranged around said centrally raised portion, one leg of said hairpin tubes communicating with said conduit for flow of water therethrough; another peripherally disposed conduit for receiving the other legs of said hairpin tubes for flow of water therethrough into said other conduit; and cooling tubes originating in said other conduit for lining said side wall and roof of said furnace chamber.

References Cited in the file of this patent

FOREIGN PATENTS

| | | |
|---|---|---|
| 147,386 | Australia | July 17, 1952 |
| 180,114 | Austria | Nov. 10, 1954 |
| 1,111,182 | France | Oct. 26, 1955 |